United States Patent [19]
Edwards

[11] Patent Number: 5,717,412
[45] Date of Patent: Feb. 10, 1998

[54] 3-D GLASSES WITH VARIABLE DUTY CYCLE SHUTTER LENSES

[75] Inventor: William Thomas Edwards, Gardendale, Ala.

[73] Assignee: Sonics Associates, Inc., Birmingham, Ala.

[21] Appl. No.: 582,406

[22] Filed: Jan. 3, 1996

Related U.S. Application Data

[63] Continuation of Ser. No. 127,765, Sep. 28, 1993, abandoned.
[51] Int. Cl.$^6$ ............................................. G09G 5/00
[52] U.S. Cl. ............................................. 345/7; 345/8
[58] Field of Search .................... 345/7, 8, 9, 139

[56] References Cited

U.S. PATENT DOCUMENTS

| | | | |
|---|---|---|---|
| 4,393,400 | 7/1983 | Ikushima et al. | 348/56 |
| 4,907,860 | 3/1990 | Noble. | |
| 4,967,268 | 10/1990 | Lipton et al. | 348/56 |
| 4,971,435 | 11/1990 | Shaw et al. | |
| 4,997,270 | 3/1991 | Shaw. | |
| 5,002,387 | 3/1991 | Baljet et al. | |
| 5,137,800 | 8/1992 | Neckers et al. | |
| 5,142,357 | 8/1992 | Lipton et al. | |
| 5,181,133 | 1/1993 | Lipton. | |
| 5,193,000 | 3/1993 | Lipton et al. | |
| 5,276,471 | 1/1994 | Yamauchi et al. | 345/8 |

*Primary Examiner*—Mark R. Powell
*Assistant Examiner*—Matthew Luu
*Attorney, Agent, or Firm*—Gregory M. Howison

[57] ABSTRACT

A shutter control mechanism for 3-D glasses includes a control circuit (28) associated with the glasses, the glasses having 3-D lenses (20) and (22). The control circuitry (28) receives commands from a control transmitter (16) in the form of synchronization pulses and command signals. The command signals are operable to vary the operating parameters of the lenses (20) and (22). Specifically, the duty cycle of the left lens (22) and the right lens (20) are varied such that they can either be at a fifty percent duty cycle, greater than a fifty percent duty cycle or less than a fifty percent duty cycle, wherein the amount of time that each of the lenses is on can be controlled for a given frame length.

25 Claims, 7 Drawing Sheets

3-D GLASSES WITH VARIABLE DUTY CYCLE SHUTTER LENSES

This application is a continuation of U.S. application Ser. No. 08/127,765 filed Sep. 28, 1993, now abandoned.

TECHNICAL FIELD OF THE INVENTION

The present invention pertains in general to the control of alternate eye viewing of a three dimensional event and, more particularly, to 3-D glasses utilizing Liquid crystal lenses that have left and right shutter controls.

BACKGROUND OF THE INVENTION

3-D viewing has always been a novelty in the film industry. In the early days of the film industry, 3-D viewing was accomplished by utilizing different color lenses in glasses which were handed out at the viewing of a motion picture. By creating the film with two cameras operating from different angles and an appropriate selection of colors, the two images could be superimposed over each other and then separated out by the viewer with the use of the glasses. However, reception by the public of 3-D viewing was less than satisfactory. In recent years, technology has allowed a more acceptable 3-D system to be created, that being the utilization of Liquid crystal lenses which can be alternately turned on and off, such that two separate, color correct pictures are presented to the viewer during each frame of the motion picture, one for the left eye and one for the right eye. The transmissive nature of the lenses is merely alternated between left and right during each frame. Of course, this requires the frame rate to be twice that of a normal motion picture.

The 3-D glasses utilizing shutter controlled Liquid crystal lenses typically have an infrared transmitter disposed in the theater, with each set of glasses worn by the viewers having a receiver disposed on the glasses. A sync pulse is transmitted to the glasses at the frame rate of the motion picture. This sync pulse is convened to a digital signal such that a rising and falling edge exists. Each rising edge initiates the beginning of a frame wherein each of the left and right lenses are controlled to turn on and off during the frame. However, circuitry internal to the glasses is used to set the "duty cycle" of the on/off control function for each of the lenses. This is typically a fifty percent duty cycle; that is, the left lens is on for fifty percent of the frame and the right lens is on for the other fifty percent of the frame. One disadvantage to having this fifty percent duty cycle is that it assumes that both the left and the right eye are equally balanced and, further, it assumes that each of the left and right eyes of the individual has an immediate response; however, this is not so. The eyes of an individual can, in fact, be unbalanced and if the picture to the left eye is mined off at the same time that the picture to the right eye is turned on, there can be some ghosting effect perceived by the viewer between the two frames.

SUMMARY OF THE INVENTION

The present invention disclosed and claimed herein comprises a shutter control system for 3-D glasses that have right and left lenses that alternate between opaque and transmissive states for a given operating frame, the operating frame being sequential and occurring on a periodic basis. A receiver is provided for receiving from an external source a shutter control command that defines operating parameters of the right and left lenses. A control device varies the parameters of the right and left lenses in accordance with the received shutter control command. This allows the operating parameters of the right and left lenses in one frame to be changed for a next and subsequent frame.

In another aspect of the present invention, the parameters varied are the duty cycle of the transmissive state of the right and left lenses. Each of the duty cycles can be varied independently to allow the respective ones of the right and left lenses to be transmissive during a portion of the operating frame. The shutter control command is comprised of a sync pulse having shutter control information encoded therein. The receiver includes a decoder for decoding the encoded information. In the preferred embodiment, the encoded information comprises the length of the sync pulse, the length of the sync pulse determining the transmissive time for at least one of the right and left lenses. A central processing unit associated with the 3-D glasses determines the length of the transmissive time for the remaining ones of the right and left lenses in accordance with predetermined criteria.

In a further aspect of the present invention, the duty cycles of both the right and left lenses is set substantially equal to each other. The duty cycle can be less than fifty percent, equal to fifty percent or greater than fifty percent, such that they overlap. Further, external control signals can be input by the user to vary the operating parameters and override the received shutter command.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
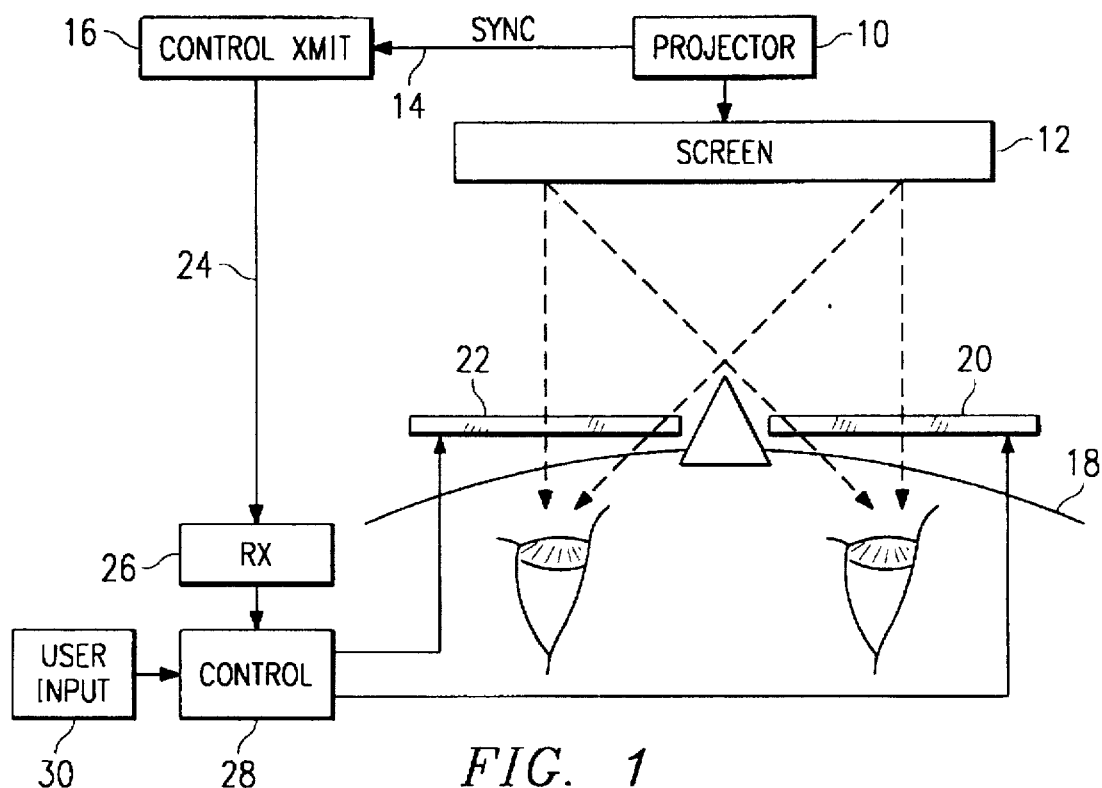
FIG. 1 illustrates a diagrammatic view of the Liquid crystal lenses and the control associated therewith.

Referring now to FIG. 1, there is illustrated a schematic view of the overall system illustrating the control features. A projection system 10 is provided for generating an image on a screen 12, the image comprising a 3-D projection which is generated by two separate projectors in the projection system 10, one for the right eye and one for the left eye. The projector 10 also outputs a sync control signal on a line 14 to a control transmitter 16. The screen 12 is operable to transmit two images, one image designated for the left eye of the viewer and one image designated for the right eye of the viewer. Glasses are provided for being disposed on a viewer's head 18, the glasses having a right lens 20 and a left lens 22. The control transmitter 16 is operable to transmit a control signal on an infrared transmission link 24 to a control receiver 26. The receiver 26 is associated with the glasses of the user 18 and is operable to receive and decode the information on the command channel 24 and transmit it to a control system 28. The control system 28 is operable to interface with each of the lenses 20 and 22 and control the parameters thereof. The control information for controlling the lenses 20 and 22 is contained on the control link 24, which command information was generated by the control transmitter 16. Alternatively, a user input 30 is provided for allowing the user of the glasses to enter control input to control the parameters of the lenses 20 and 22. As will be described hereinbelow, the parameters that are controlled with the preferred embodiment are the duty cycle parameters of lenses 20 and 22. However, any other parameters of the lenses, such as polarization, contrast, etc., that can enhance the viewing of 3-D projections can be controlled by the control system 28. In the illustrative embodiment described hereinbelow, the left eye is assumed to be associated with the first portion of the frame in a video reproduction; however, typical reproductions utilize the right eye first and the left eye second. The description hereinbelow, although directed to having the left eye presented with the first portion of the image in a given frame, is equally applicable to the right eye being presented with the first portion of the image in a given frame.

Figure 2A:
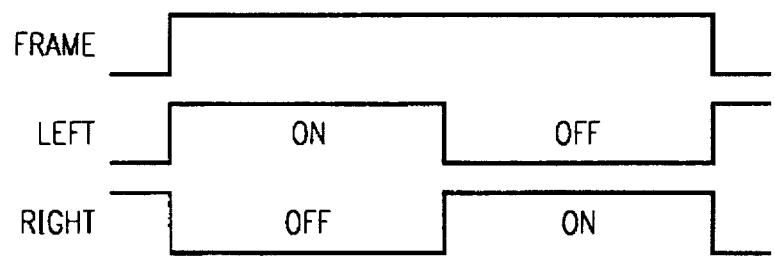
FIG. 2a illustrates a conventional operation wherein the lenses are operated on a fifty percent duty cycle.
Figure 2B:
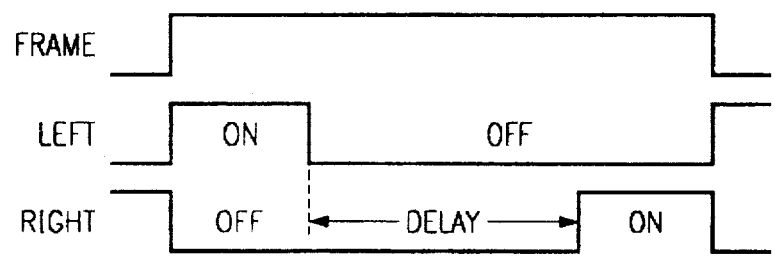
FIG. 2b illustrates an adjustment of the duty cycle of each of the Liquid crystal lenses in accordance with the present invention.

Referring now to FIG. 2a and FIG. 2b, there are illustrated waveforms for operating the right lens 20 and the left lens 22. In FIG. 2a, there is illustrated an example wherein the duty cycle is fifty percent. A Frame Pulse is generated which indicates the beginning and the end of a frame, a frame being the time during which a "pair" of transmissions is generated by the projector 20 for viewing on the screen 12. In a non-3-D system, there would only be one picture generated during each frame. However, in a 3-D picture, two pictures will be generated, one for the left eye and one for the fight eye. In the beginning of the frame, the left lens 22 is rendered transmissive and the fight lens 20 is rendered opaque, thus scattering the light. In the second half of the frame, the opposite is true, the left lens 22 is rendered opaque and the fight lens 20 is rendered transmissive in FIG. 2b, it can be seen that in the first portion of the frame, the left lens 22 is rendered transmissive for only a portion of the frame, less than fifty percent. Thereafter, both lenses 20 and 22 are rendered opaque for a predetermined amount of time. After a predetermined delay, the fight lens is then rendered transmissive for the remainder portion of the frame.

Figure 3:
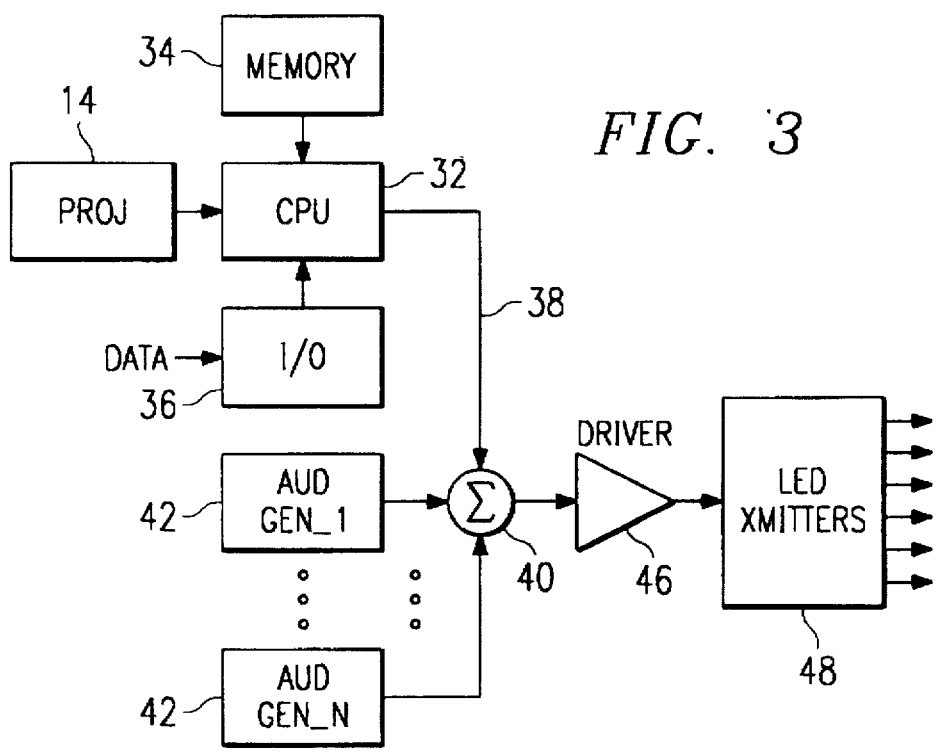
FIG. 3 illustrates a block diagram view of the transmitter.

Referring now to FIG. 3, there is illustrated a block diagram of the control transmitter 16. A Central Processing Unit (CPU) 32 is operable to control the dam portion of the control transmitter relating to the shutter control operation. The CPU 32 is a conventional CPU that provides instruction execution operations. Data and instructions are stored in a memory 34, which instructions are then executed in accordance with predetermined programs stored in the memory 34. Memory 34 is comprised in part of non-volatile Read Only Memory and volatile Random Access Memory. The input/output circuit 36 is provided for interfacing with an external data input to allow the user to input data to the CPU 32 for storage in the memory 34. The CPU 32 is also operable to receive timing information from the projector 14 in the form of the synchronization pulses. The CPU then outputs data and control signals on a line 38 to a summing network 40. The summing network 40 is basically a modulator for encoding the information on line 38 onto a carrier. In the preferred embodiment, the carrier associated with the data generated by the CPU 32 is a 76.8 kHz carrier. The data on line 38 is serial data and is encoded in the form of sync pulses and data that is embedded within the sync pulse, as will be described in more detail hereinbelow.

Figure 3A:
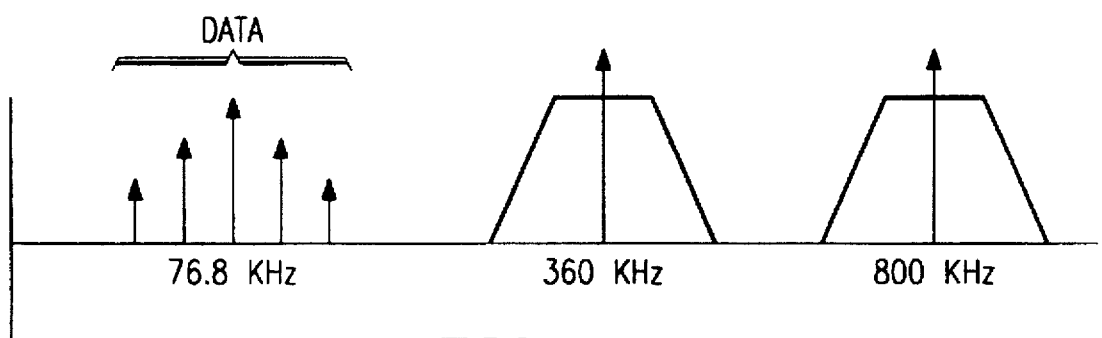
FIG. 3a illustrates the frequency domain output by the transmitter.

In addition to the data, audio is also input to the summing junction 40, which summing junction 40 is operable to modulate each of the audio inputs into a separate carrier and then sum all of the carrier. A plurality of multiple channel audio signals is provided for, with each channel controlled by an audio generator 42. Each of the audio generators 42 is operable to generate audio information on a separate channel for input to the summing junction 40, the summing junction 40 then encodes this audio on a separate carrier. For example, one carrier could be 360 kHz and another carrier could be 800 kHz. Dependent upon the bandwidth of the transmitter, multiple transmitters could be provided. The space between the carriers is defined by the bandwidth about the carrier in which the encoded audio is contained. The frequency response of interest is illustrated in FIG. 3a.

After all information, the audio and the data, has been modulated onto respective carriers, the output is input to a driver circuit 46 which is operable to drive a plurality of infrared LED emitters 48. These are conventional infrared LED emitters that are utilized for generating the sync pulse in present 3-D shutter controlled viewing systems.

Figure 4:
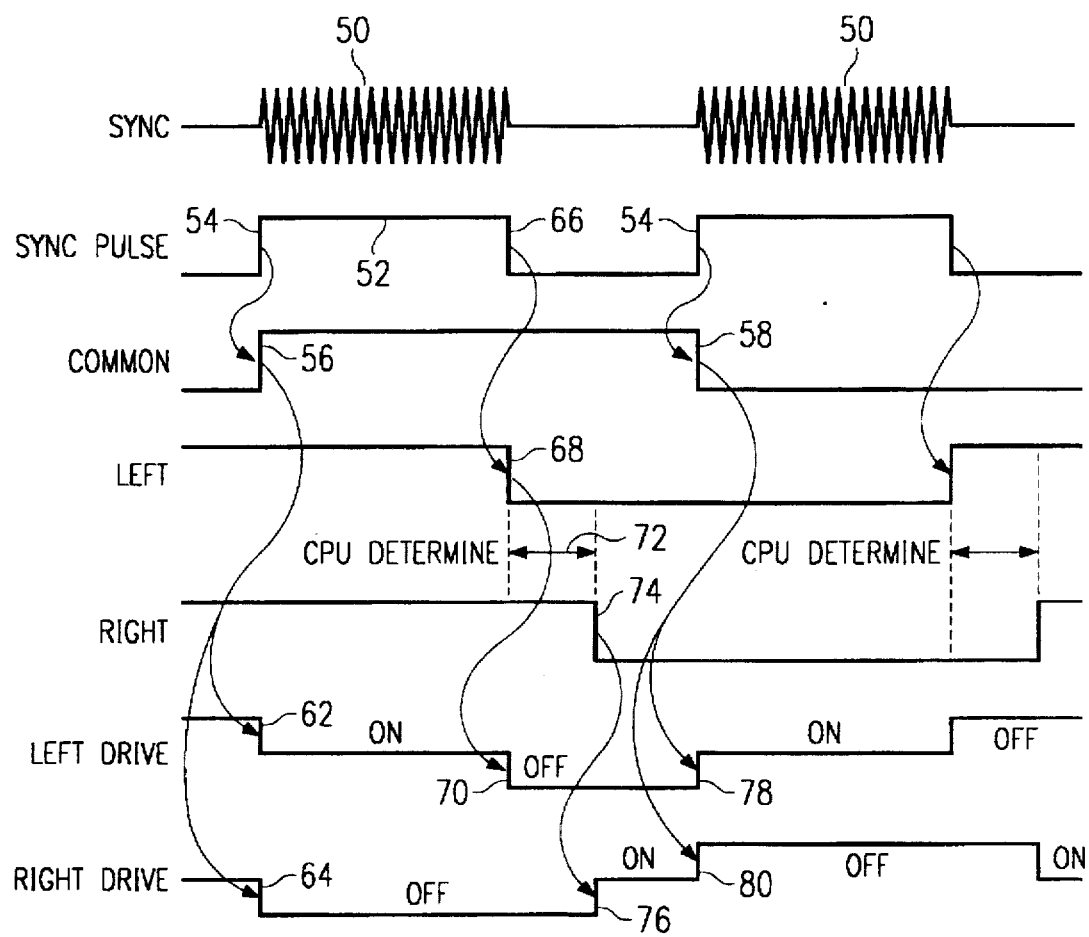
FIGS. 4 and 4a illustrates a timing diagram illustrating the relationship between the sync pulses and the Liquid crystal lens control.

Referring to FIG. 4, there is illustrated a timing diagram illustrating the technique for controlling the duty cycle of the left and fight shutters in the viewing glasses. A series of encoded sync pulses 50 are transmitted utilizing amplitude shift keying techniques. In this technique, the DC value is equal to zero but, periodically, the encoded sync pulse 50 comprising a burst of higher frequency signal is transmitted. The length of this burst is decoded into a Sync pulse 52. As will be described hereinbelow, the length of the Sync pulse 52 is a technique by which the duty cycle between the left and right lenses of the viewing glasses is controlled. When the Sync pulse 52 goes high at an edge 54, a Common signal also goes high at an edge 56. The Common signal will remain high until the next leading edge 54 of the pulse 52 occurs, at which time it goes low, as indicated by a falling edge 58. As is conventional operation, the drive signals to the lenses are comprised of a positive voltage, a negative voltage and a common or zero voltage. The lenses are disposed at either a positive 15 volts or a negative 15 volts in order to render them opaque. When the voltage is ground or common, the lenses are transmissive. It is necessary to switch the lenses from a +15 volts to a ground and then from a ground to a −15 volts and then from a −15 volts to ground and then from a ground to a +15 volts in order not to stress the Liquid crystal lenses or, more correctly, to prevent a "memory" from preventing the Liquid crystal lenses from going to a completely opaque state. This is illustrated by a Left Drive signal and a Right Drive signal. It should be understood that only a +15 volt supply is provided, with the −15 volt level being achieved by reversing the voltages applied to the liquid crystal lens terminals. Further, there are "Left" and "Right" control signals that are generated. The relationship between each of the Left and Right and Common signals is what determines the Left Drive and Right Drive signals. For example, if the Common signal is low and the Left signal is high, the voltage on the Left Drive signal will be +15 volts. When both the Common signal and the Left signal are the same, the voltage of the Left Drive signal will be at ground. Whenever the Common signal is high and the Left signal is low, the voltage will be at −15 volts. Therefore, when the Left signal is high and the Common signal at rising edge 56 goes high, the Left Drive signal will go from a +15 volts to ground, as indicated by a falling edge 62. At the same time, the Right Drive signal goes from a ground condition to an off condition at a negative 15 volts, as is indicated by a falling edge 64. This all occurs at the beginning of the Sync pulse 52.

When the Sync pulse 52 goes low at a falling edge 66, the Left signal goes low at an edge 68. This results in the Left Drive signal going from a zero voltage, indicating an ON state of the left lens 22, to a −15 volt state at a falling edge 70. This results in the left lens 22 being changed to an opaque condition or OFF condition. Normally, when the Left Drive signal results in an opaque condition for the left lens 22, the Right Drive signal would set the right lens 20 to a transmissive state. However, that is the prior art system. In the present system, a predetermined delay 72 is interposed into the system by the CPU and is associated with the glasses, and which will be described in more detail hereinbelow. This delay 72 results in the Right signal going low at an edge 74, which results in the Right Drive signal going from an OFF condition to an ON condition, as indicated by a rising edge 76, indicating the Right Drive signal going from −15 volts to 0 volts.

On the next rising edge of the Sync pulse 52, as indicated by rising edge 54, the falling edge 58 occurs and this results in a rising edge 78 on the Left Drive signal and a rising edge 80 on the Right Drive signal, such that the Left Drive signal goes from an OFF state to an ON state and the Right Drive signal goes from an ON state to an OFF state.

It can be seen, therefore, that the length of the Sync pulse 52 provides the programming information to the glasses. If the Sync pulse 52 is longer, the ON time for the left lens 22 and the ON time for the right lens 20 is longer. It is only necessary to vary the length of this pulse in order to control the length of the ON time for either of the lenses. This can be advantageous in that, during some programs, the scenes change from dark scenes to light scenes, as some scenes may be associated with an indoor scene and some scenes may be associated with an outdoor scene. The producer may want to change the amount of time the lens is on for each portion of the frame that the picture is present to change the effect. For example, it may be desirable to leave the lens in the transmissive state longer during a dark scene and shorter for a bright scene.

Figure 4A:
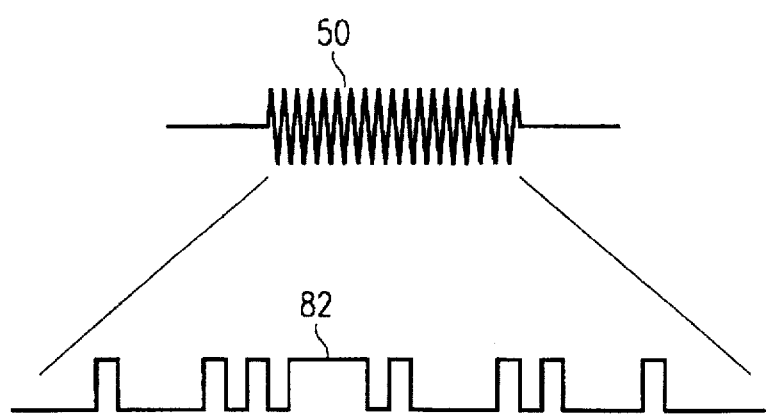

Referring now to FIG. 4a, there is illustrated an alternate embodiment for encoding information with the Sync burst 50. The Sync burst 50 is typically detected at the receiver to generate the Sync pulse 52. However, information can be encoded within the Sync pulse 50 by using such techniques as Frequency Shift Keying (FSK), or Phase Shift Keying (PSK), with FSK being the preferred implementation. Of course, other techniques could be utilized. When the Sync burst 50 is decoded at a higher rate, a digital string 82 of pulses is achieved. These are Non Return-to-Zero pulses (NRZ). By utilizing this type of encoding, command words can be embedded within the sync burst 50. These command words could provide finite timing information to the CPU at the receiver as opposed to the length of time at the sync pulse. Additionally, these command words would provided volume information and selections of various audio channels. The sync pulse would then provide hard data, and also timing information as to the frame rate.

Figure 5A:
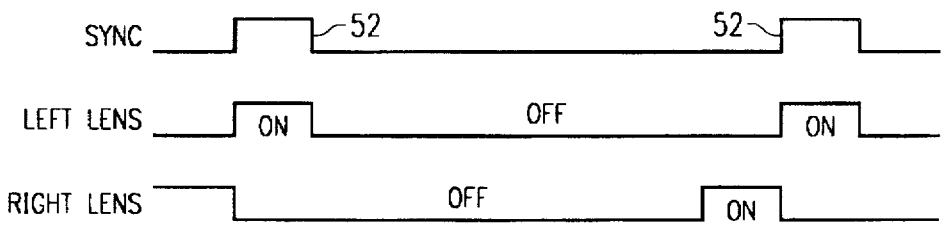
FIGS. 5a–5d illustrate the various duty cycle configurations of the left and right lenses.

Referring now to FIGS. 5a–5d, there are illustrated timing diagrams of the Sync pulse 52 relative to the operation of the left lens 22 and the right lens 20. In FIG. 5a, it can be seen that the left lens is on only a short period of time at the beginning of the frame and the right lens is on only a short time during the end of the frame. It can be seen that the length of time that the left lens is on is a function of the length of the sync pulse 52, whereas a predetermined amount of delay is imposed in the system prior to turning on the right lens 20, this determined by the CPU. The CPU determines this by knowing the duty cycle of the Sync pulse 52. The delay is then calculated.

Figure 5B:
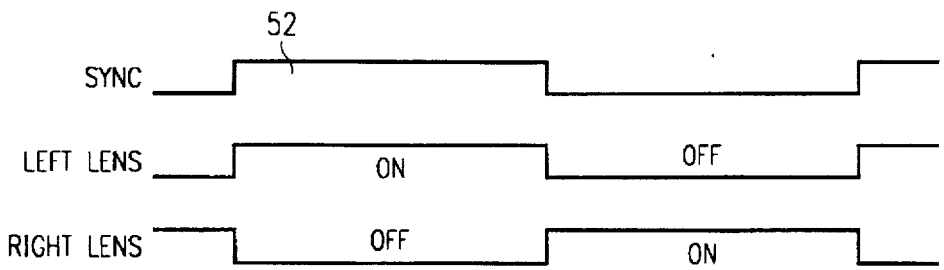

In FIG. 5b, the system is provided with a Sync pulse 52 having a fifty percent duty cycle. In this mode, the left lens 22 will be on the same time as the right lens 22.

Figure 5C:
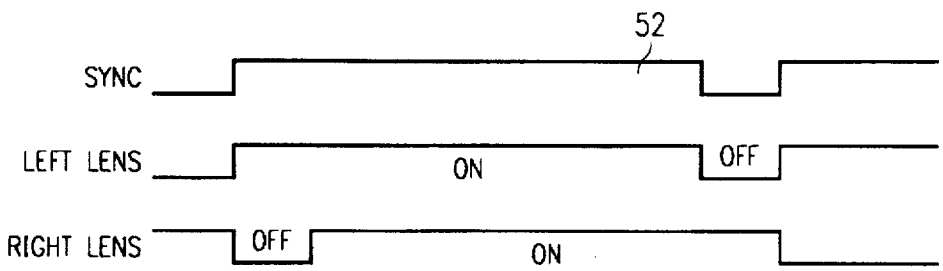

In FIG. 5c, there is illustrated an alternate embodiment wherein the sync pulse 52 has a duty cycle wherein the Sync pulse 52 is high for greater than fifty percent of the period. The CPU will then adjust the time at the right lens 20 such that there will be a "negative delay" and the right lens 20 will turn on prior to the left lens 22 turning off. This provides an overlap which is desirable in the preferred embodiment to allow the left lens to be on during the initial period of time that the right lens is turned on. However, due to the fact that the CPU 90 determines when the right lens 20 turns on as a function of the length of the sync pulse, this information must be stored for the next cycle. In general, the CPU determines the length of the frame from leading edge to leading edge of the Sync pulse 52 and then determines when the right lens 20 is turned on relative to the leading edge of the Sync pulse 52. This information is stored in a buffer or register and can be updated at any time.

Figure 5D:
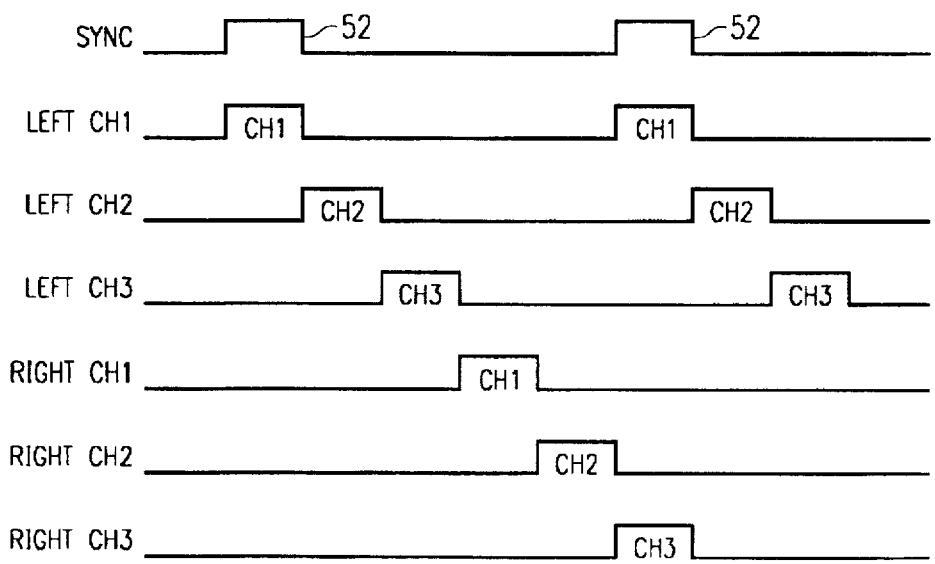

In FIG. 5d, there is illustrated a situation wherein each of the left and right lenses is operated on selectable channels. This allows the producer to actually transmit multiple programs on the same screen. For example, if the producer wanted to multiplex three programs onto the same screen at the same time, it would be necessary to divide each half of a given frame into three sections, one for each channel. Therefore, one third of the time that the left lens would normally transmit would be rendered transmissive during the first sixth of the frame to receive the first channel left lens information. In the second third of the first half, or the second sixth of the frame, the left lens would be rendered transmissive for only receiving the second channel left lens information. The third sixth of the frame or third portion of the left lens side of the frame, would be rendered transmissive for viewing the third channel of information. The same would occur for the right half of the frame associated with the right lens. This would provide three left channels and three right channels. To implement this, data would be transmitted to the lens, the lenses having specific IDs associated with the specific channel. This would allow the viewer to view one of three selected programs.

Figure 6:
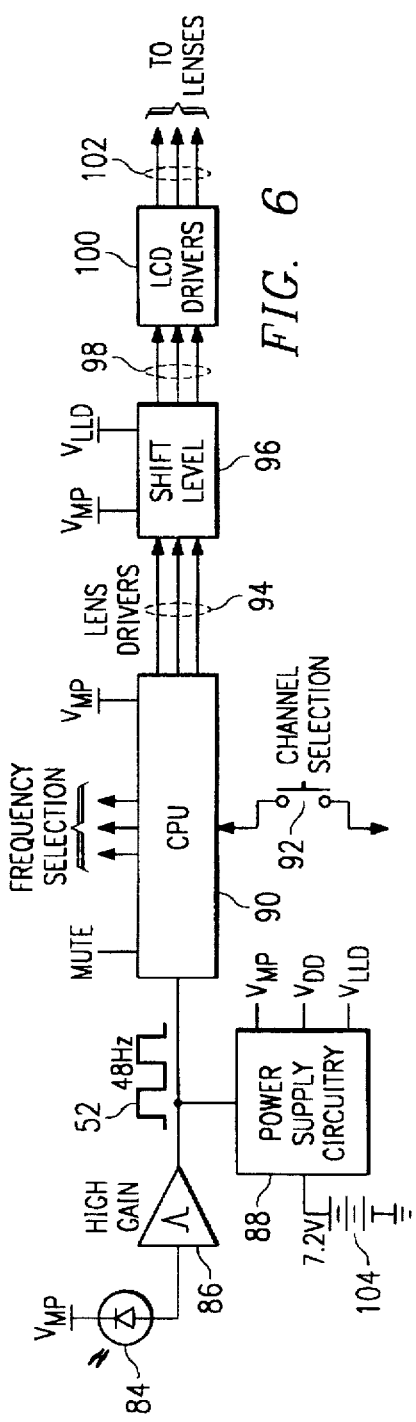
FIG. 6 illustrates a block diagram of the controller.

Referring now to FIG. 6, there is illustrated a block diagram of the controller. A photodetector diode 84 is operable to receive the transmission from the transmitter and input it to a high gain preamplifier 86. The high gain preamplifier 86 is operable to both filter the data received on the photo diode 84 and also generate the Sync pulse 52, which operates at a frequency of approximately 48 Hz (the frame ram of the projection system). The preamplifier 86 is input to power supply control circuitry 88 and also to the input of a CPU 90. The CPU 90 is a single chip CPU of the type 68HC705 manufactured by Motorola. The CPU 90 is operable to output a Mute signal and also frequency selection control signals for use by the audio section. A voltage input $V_{\mu p}$ is provided to power the CPU 90. A channel selection switch 92 is also input to the CPU 90 as an external user input. The CPU 90 is operable to output three lens driver control signals on lines 94, which are input to a level shift circuit 96. Level shift circuit 96 is controlled by the power supply signal $V_{\mu p}$ and also receives as an output drive voltage a voltage $V_{LCD}$. The level shift circuit 96 is operable to input three drive signals 98 to a liquid crystal lens driver 100 to output the drive control signals to the left and right lenses on lines 102.

The power supply control circuit 88 is operable to receive the output of the preamp 86 in the form of the sync pulses 52 and also receive a battery supply input from a battery 104. Power supply control circuitry 88 is operable to generate from the battery 104 three power supply signals, $V_{\mu p}$, $V_{DD}$ and $V_{LCD}$.

Figure 7:
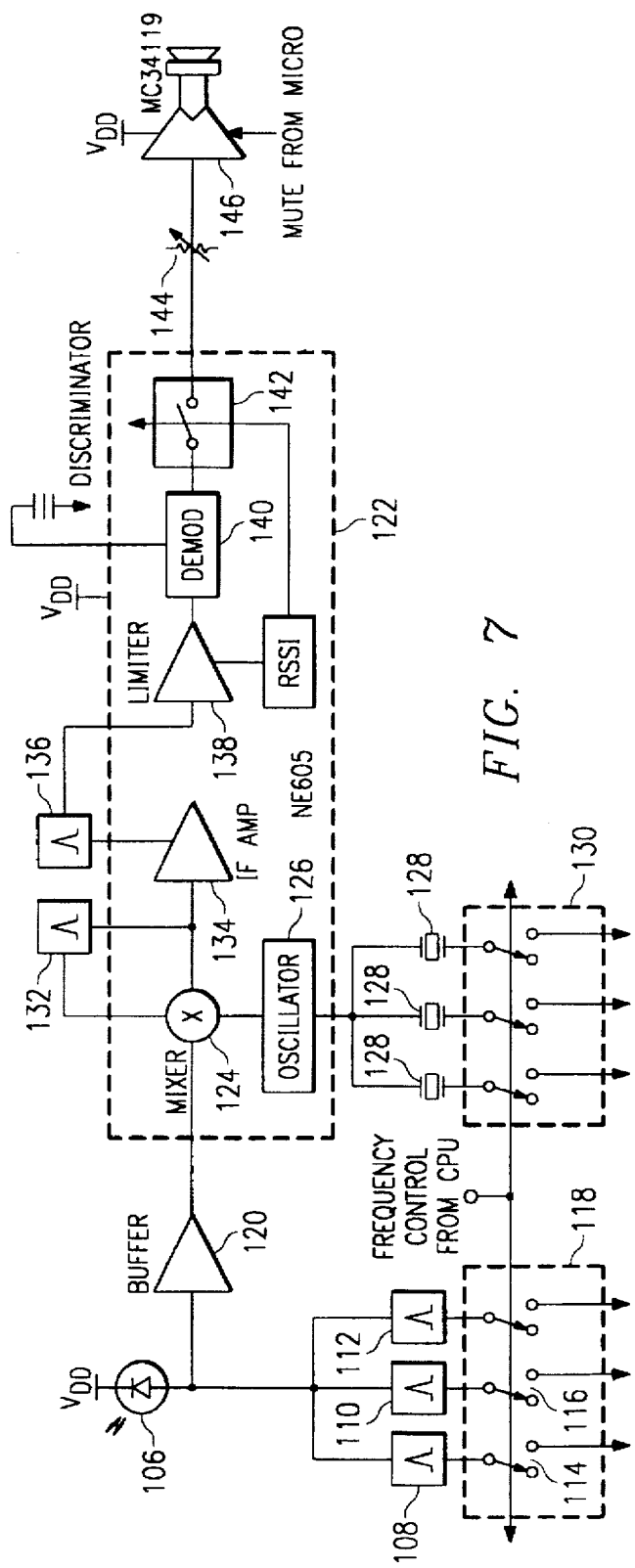
FIG. 7 illustrates a block diagram of the audio receiver.

Referring now to FIG. 7, there is illustrated a block diagram of the audio receiver. A photodetector diode 106 is operable to receive the transmission from the transmitter and filter the input with one of three bandpass filters 108, 110 and 112. Only one of the filters 108-112 is selected by respective switches 114, 116 and 118. The switches 114-118 are controlled by the frequency control signals from the CPU 90. The filters 108-112 allow selection of one of the various pairs of channels that were generated at the transmitter.

The output of the photodetector 106, after filtering, is input to a buffer 120, the output thereof input to an audio chip 122 of the type NE605, manufactured by Signetics. The buffer output is input to one input of a mixer 124 which has the local oscillator input thereof connected to a local oscillator 126. Local oscillator 126 has the frequency thereof selected by one of three crystals in a crystal bank 128, the crystals 128 selected by one of three switches 130. Switches 130 are Controlled by the frequency control signal from the CPU 90. The mixer 124 is operable to upconvert the signal output by the buffer 120 and then filter it with a ceramic filter 132. The output of the filter 132 comprises an intermediate frequency which is then input to an IF amplifier 134, the output thereof again filtered with a ceramic filter 136 external to the chip 122 and then input to a limiter 138. The limiter 138 is then input to a demodulator circuit 140 which has the output thereof connected through a switch 142 to an output volume control 144. This is then input to a power amplifier 146, which drives the speakers. This is a conventional FM receiver operation.

Figure 8:
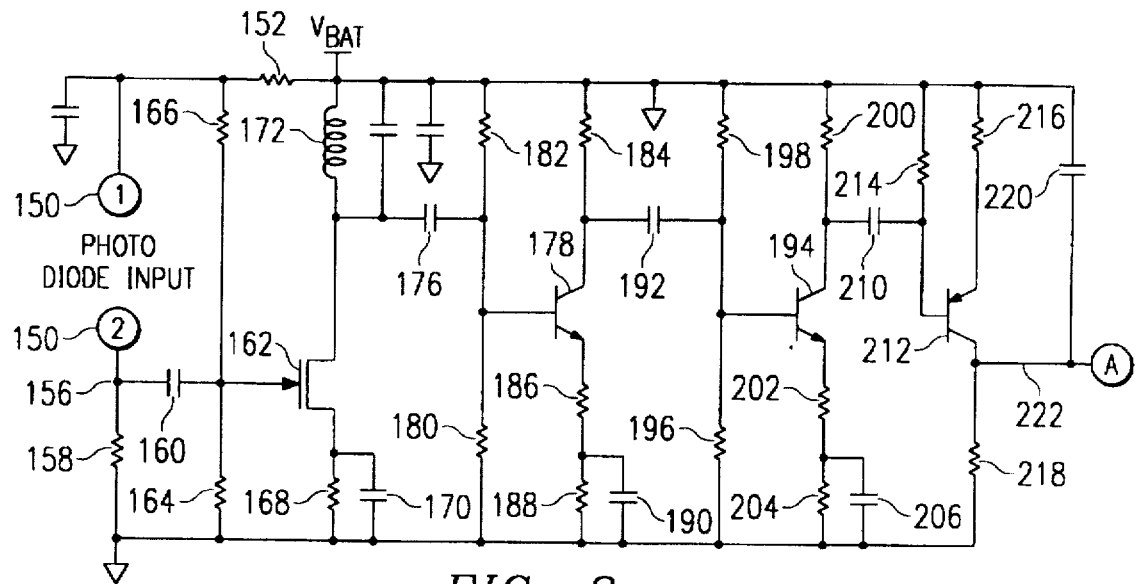
FIG. 8 illustrates a schematic diagram of the input buffer portion of the sync pulse receiver.

Referring now to FIG. 8, there is illustrated a detailed schematic diagram of the input buffer to the sync pulse receiver. The photo diode 84 is connected between positive and negative terminals 150, the cathode terminal connected to the battery voltage $V_{BAT}$ through a resistor 152 and the anode terminal thereof connected to a node 156 which is connected to ground through a resistor 158. The node 156 is connected through a capacitor 160 to the gate of an N-channel JFET transistor 162. The gate of transistor 162 is biased by a resistor network comprised of a first resistor 164 connected to ground and a second resistor 166 connected to $V_{BAT}$ through the resistor 152. The source of transistor 162 is connected to one side of a resistor 168 and a parallel connected capacitor 170. The other side of resistor 168 and capacitor 170 are connected to ground. The drain of transistor 162 is connected to one side of an inductor 172, the other side thereof connected to $V_{BAT}$, inductor 172 having a capacitor 174 connected in parallel therewith. The drain of transistor 162 is also connected through a series capacitor 176 to the base of an NPN transistor 178. The base of transistor 178 is biased by a resistor divider comprised-of a base-to-ground resistor 180 and a $V_{BAT}$-to-base resistor 182. The collector of transistor 178 is connected through a bias resistor 184 to $V_{BAT}$ and the emitter of transistor 178 is connected through a resistor 186 to one side of a resistor 188. Resistor 188 has the other side thereof connected to ground with a capacitor 190 connected in parallel therewith.

The collector of transistor 178 is connected through a series capacitor 192 to the base of an NPN transistor 194. Transistor 194 has the base thereof connected through a resistor 196 to ground and a resistor 198 to $V_{BAT}$. The collector of transistor 194 is connected to $V_{BAT}$ through resistor 200 with the emitter thereof connected through a resistor 202 to one side of a resistor 204, the other side of resistor 204 connected to ground and a capacitor 206 connected in parallel therewith. The collector of transistor 194 is connected through a series capacitor 210 to the base of a PNP transistor 212, the base thereof also connected to $V_{BAT}$ through a resistor 214. Transistor 212 has the emitter thereof connected to $V_{BAT}$ through a resistor 216 and the collector thereof connected to ground through a resistor 218. A capacitor 220 is connected between the collector and $V_{BAT}$, the collector of transistor 212 comprising the output on a line 222.

Figure 9:
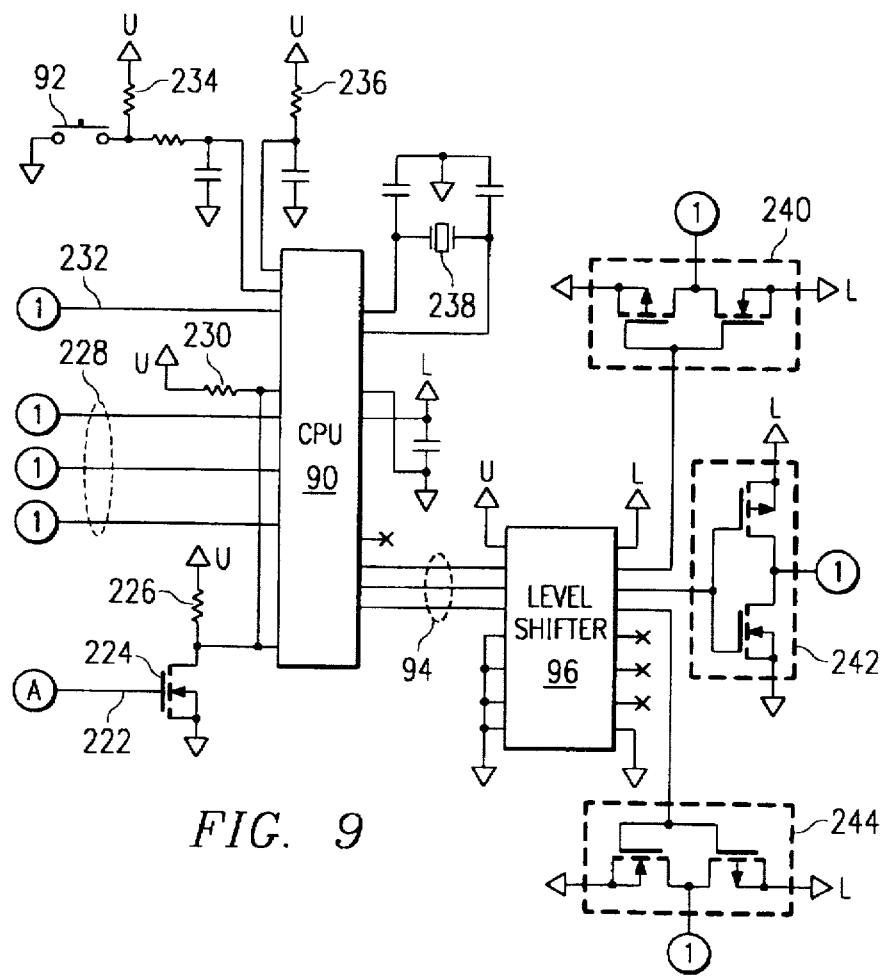
FIG. 9 illustrates a schematic diagram of the control portion of the sync pulse receiver.

Referring now to FIG. 9, there is illustrated a circuit diagram of the control portion of the controller of FIG. 6. The signal on line 222 is connected to the gate of an N-channel MOSFET transistor 224, the source thereof connected to ground and the drain thereof connected through a resistor 226 to $V_{\mu p}$. The drain of transistor 224 is input to the CPU chip 90. The CPU 90 is operable to output three frequency control signals on lines 228. The Interrupt Request input is connected to $V_{\mu p}$ through a resistor 230 and the CPU 90 is operable to output a Mute signal on a line 232. The external switch 92 is connected to a pullup resistor 234 to $V_{\mu p}$ and then to an input to the CPU 90. The reset input is connected through a resistor 236 to $V_{\mu p}$. A crystal 238 is connected between the two oscillator inputs thereof. The outputs on lines 94 are input to the level shift circuit 96, which comprises an MC14504, manufactured by Motorola. One output is connected to a first set of driver transistors 240, one output thereof connected to a second set of driver transistors 242 and a third output connected to a set of driver transistors 244. Each set of driver transistors 240-244 is comprised of two transistors configured in a standard CMOS configuration, an N-channel MOSFET transistor and a P-channel MOSFET transistor having the source/drain paths thereof connected in series with the common point therebetween providing the output of circuit. The gates thereof are connected together and comprise the input with the source of the P-channel transistor connected to $V_{LCD}$, and the source of the N-channel transistor connected to ground with the drain of the transistors connected together. The output of the circuit 240 comprises the left lens driving circuit, the output of circuit 244 comprises the right lens driving circuit and the output of the circuit 242 comprises the lens Common driving signal. These correspond to the Left, Right and Common signals described hereinabove with respect to FIG. 4.

Figures 10, 11:
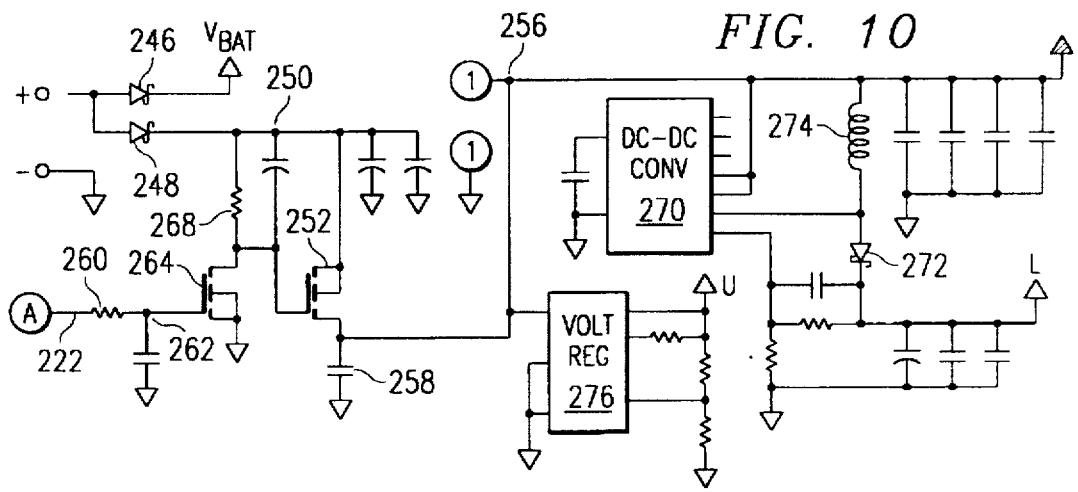
FIG. 10 illustrates a schematic diagram of the power supply control portion of the sync pulse receiver.
FIG. 11 illustrates a flowchart for controlling the duty cycles.

Referring now to FIG. 10, there is illustrated a schematic diagram of the battery control circuitry 88 of FIG. 6. The battery voltage is passed through a Schottky diode 246 to provide the voltage $V_{BAT}$. This will always be present as long as the battery is present. Additionally, the battery voltage is passed through a second Schottky diode 248 to a node 250. The node 250 is connected to the source of the P-channel MOSFET transistor 252, the drain thereof connected to a $V_{DD}$ terminal 256, a capacitor 258 connected between the node 256 and ground. The transistor 252 comprises the supply switch which is controlled by the Sync pulse 52 on line 222. The signal on line 222 is input through a resistor 260 to one side of a capacitor 262, the other side of capacitor 262 connected to ground. The resistor 260 and capacitor 262 comprise an integrating function wherein the node between the resistor 260 and capacitor 262 charges up as long as sync pulses are received. This will be input to the gate of an N-channel transistor 264, the source/drain path thereof connected between the gate of transistor 252 and ground. A resistor 268 is connected between the gate of transistor 252 and the node 250 to pull the gate of transistor 252 high whenever transistor 264 is not conducting. Therefore, whenever the Sync pulse 52 is terminated, capacitor 262 will discharge; turning off transistor 264 and turning off transistor 252.

The voltage on node 256 is input to a first voltage regulator circuit 270 of the type MAX630 manufactured by Maxim, which is operable to utilize a plurality of components, including a Schottky diode reference 272 and an inductor 274 to generate the regulated voltage output $V_{LCD}$. Similarly, the voltage $V_{DD}$ on node 256 is utilized as an input to a voltage regulator circuit 276 of the type MAX663, manufactured by Maxim, which utilizes a resistive combination to generate an output regulated voltage. The regulated voltage from circuit 276 is the voltage $V_{up}$, which is isolated from $V_{DD}$ on node 256 by the circuit 276.

Referring now to FIG. 11, there is illustrated a flowchart depicting the operation of the CPU 90. The program is initiated at a start block 280 and then proceeds to a decision block 282 to determine if the leading edge of the Sync pulse 52 has been received. If not, the program flows along an "N" path back to the input thereof. When the leading edge has been detected, the program flows along a "Y" path to a function block 284 to turn the fight lens off and the left lens on. It is important to understand that either lens could be turned on first, but for purposes of illustration, the left lens will be considered the first lens to be turned on in a frame. The program then flows to a decision block 281 to determine if the duty cycle is greater than fifty percent. If so, the program flows along a "Y" path to a decision block 283 to determine if the "minus" delay is at a maximum. The "minus" delay is the amount of time that the fight lens is off after the left lens is turned on and prior to the time the left lens is turned off. Until this delay is at a maximum, the program flows along an "N" path back to the input of the decision block 283. When the maximum delay is obtained, the program flows along the "Y" path to a function block 285 to turn the fight lens on. The program then flows to a decision block 286, which is the path that the program would take if the duty cycle were determined-not to be greater than fifty percent by the decision block 281.

The decision block 286 is operable to determine if the falling edge of the Sync pulse 52 has occurred. If not, the program flows along an "N" path back to the input thereof. When the failing edge occurs, the program flows along a "Y" path to a function block 288 to turn the left lens off and then to a decision block 290 to determine if the duty cycle is less than fifty percent. If so, the program flows along a "Y" path to a decision block 292 to determine if the positive delay is equal to the maximum value. If not, the program flows back around the "N" path to the input of decision block 292. This continues until the delay is equal to the maximum delay. This is typically defined by a software counter where the counter is incremented for each loop until the maximum delay has occurred. After the delay has been reached, the program flows along a "Y" path to a function block 294 to turn the fight lens on. The program then flows back into the input of decision block 282.

In the situation where the duty cycle is determined not to be less than fifty percent, the program would flow along an "N" path to a decision block 296 to determine if the duty cycle is equal to fifty percent. If so, the program flows along a "Y" path to the input of function block 294 and immediately turns the fight lens on with no delay. However, if the program determined that the duty cycle was not equal to fifty percent, this would mean that it is greater than fifty percent. Since the earlier decision block 281 had already tested the duty cycle and determined that it was not fifty percent, this would mean that information had been received indicating that the duty cycle had changed. This is due to the fact that, during a given frame, the duty cycle during that frame is set by information received in a previous frame. Therefore, if the duty cycle is to be changed in the situation where the duty cycle is greater than fifty percent in the present embodiment, then the CPU 90 requires at least one cycle of history. Of course, if the information were encoded in the pulse as digital information, the duty cycle could be controlled during the frame that it was received.

If the decision block 296 had determined that the duty cycle were greater than fifty percent, the program would then flow along the "N" path to a function block 300 to set the "minus" delay value for the next cycle. This would be required since the left lens had already been turned off. The program would then flow to the function block 294 to turn the fight lens on.

In summary, there has been provided a system for varying the parameters of operation for 3-D shutter controlled glasses. The shutters are the type implemented with Liquid crystal lenses which go from an opaque to a transmissive state. A transmitter is operable to transmit over a wireless data link information as to the duty cycle of the lenses and also synchronization information. This information is decoded from the wireless data link and utilized to vary the duty cycle of the two lenses in the glasses such that the left lens in the glasses is on a portion of the time and the right lens is on another portion of the time. Typically, the left lens will occupy one-half of the sync frame and the right lens will occupy the second half of the sync frame. The duty cycle is varied such that the portion of the frame occupied by the left lens being transmissive is increased whereas the portion occupied by the right lens will also be subsequently increased. The sync pulse is utilized to control this operation by varying the length of the sync pulse. Therefore, synchronization information and control information is provided by the sync pulse.

Although the preferred embodiment has been described in detail, it should be understood that various changes, substitutions and alterations can be made therein without departing from the spirit and scope of the invention as defined by the appended claims.

What is claimed is:

1. A shutter control system for glasses having right and left lenses that alternate between opaque and transmissive states during a given operating frame, the operating frames sequentially occurring in a periodic manner at a given synchronization rate, comprising:

a receiver for receiving from an external source a shutter control command having imbedded therein shutter control information defining operating parameters of the right and left lenses, which shutter control information does not determine the periodic timing of the lenses; and a control device for varying the operating parameters of the right and left lenses in accordance with said received shutter control information, such that the operating parameters of the right and left lenses in one time can be varied in the next and subsequent time in response to the received shutter control information in the next and subsequent time.

2. The shutter control system of claim 1, wherein said receiver is operable to receive said shutter control commands from a wireless data link, said wireless data link connected to a remote transmitter for transmitting to a plurality of 3-D glasses.

3. The shutter control system of claim 1, wherein the right and left lenses are controlled by said control device in an independent manner such that the operating parameters of the left lens can be varied independent of the operating parameters of the right lens.

4. The shutter control system of claim 1, wherein said operating parameters comprise the duty cycle of the right and left lenses during a given frame.

5. The shutter control system of claim 4, wherein said shutter control command comprises a sync pulse for defining the time timing, said sync pulse having said shutter control information imbedded therein and said receiver further comprising decode circuitry for decoding from said sync pulse said imbedded shutter control information.

6. A shutter control system for glasses having right and left lenses that alternate between opaque and transmissive states during a given operating frame, the operating frames sequentially occurring in a periodic manner at a given synchronization rate, comprising:

a receiver for receiving from an external source a shutter control command having imbedded therein shutter control information defining operating parameters of the right and left lenses, which shutter control information does not determine the periodic timing of the lenses, said operating parameters comprising the duty cycle of the right and left lenses during a given frame and said shutter control command comprising a sync pulse for defining the frame timing, said sync pulse having said shutter control information imbedded therein and said receiver further comprising decode circuitry for decoding from said sync pulse said imbedded shutter control information, said imbedded shutter control information comprising the length of said sync pulse, the length of said sync pulse defining the transmissive time of at least one of the fight and left lenses; and a control device for varying the operating parameters of the fight and left lenses in accordance with said received shutter control information, such that the operating parameters of the fight and left lenses in one frame can be varied in the next and subsequent frame in response to the received shutter control information in the next and subsequent frame.

7. A shutter control system for glasses having right and left lenses that alternate between opaque and transmissive states during a given operating frame, the operating frames sequentially occurring in a periodic manner at a given synchronization rate, comprising:

a receiver for receiving from an external source a shutter control command having imbedded therein shutter control information defining operating parameters of the right and left lenses, which shutter control information does not determine the periodic timing of the lenses, said operating parameters comprising the duty cycle of the right and left lenses during a given frame and said shutter control command comprising a sync pulse for defining the frame timing, said sync pulse having said shutter control information imbedded therein and said receiver further comprising decode circuitry for decoding from said sync pulse said imbedded shutter control information, said shutter control information determining the length of time that one of the left and fight lenses is transmissive; and a control device comprising in part a central processing unit for varying the operating parameters of the fight and left lenses in accordance with said received shutter control information, such that the operating parameters of the right and left lenses in one frame can be varied in the next and subsequent frame in response to the received shutter control information in the next and subsequent frame, said central processing unit determining the length of time that the remaining one of the right and left lenses is transmissive by determining the duty cycle of the determined one of the fight and left lenses.

8. The shutter control system of claim 4, wherein the duty cycle of at least one of the right and left lenses can be varied to be less than fifty percent.

9. The shutter control system of claim 4, wherein the duty cycle of both the right and left lenses is substantially equal.

10. The shutter control system of claim 4, wherein the duty cycle of at least one of the right and left lenses can be varied to be greater than fifty percent.

11. The shutter control system of claim 1, and further comprising an external input device for allowing the user to input shutter control command information to vary the operating parameters of the right and left lenses independent of the shutter control command information received by said receiver.

12. A shutter control system for glasses having right and left lenses that alternate between opaque and transmissive states during a given operating frame, the operating frames sequentially occurring in a periodic manner at a given synchronization rate, comprising:

a receiver for receiving from an external source frame synchronization information associated with the Synchronization rate;

a duty cycle device for synchronizing the flames with said frame synchronization information and for defining the duration of each frame during which each of the right and left lenses are transmissive; and a control device for varying the duration of time the right and left lenses are transmissive during a given frame in response to the receipt of an external shutter control command that defines the duty cycle of each of the fight and left lenses, such that the operating parameters of the right and left lenses in one frame can be varied in the next and subsequent frame in response to the received external shutter control command.

13. The shutter control system of claim 12, wherein the right and left lenses are controlled by said control device in an independent manner such that the duty cycle of the left lens can be varied independent of the duty cycle of the right lens.

14. A method for controlling glasses having fight and left lenses that alternate between opaque and transmissive states during a given operating frame, the operating frames sequentially occurring in a periodic manner at a given synchronization rate, comprising the steps of:

receiving from an external source a shutter control command having imbedded therein shutter control information defining operating parameters of the fight and left lenses, which shutter control information does not determine the periodic timing of the lenses; and varying the operating parameters of the right and left lenses in accordance with the received shutter control information, such that the operating parameters of the right and left lens in one frame can be varied in the next and subsequent frame in response to the received shutter control information.

15. The method of claim 14, wherein the step of receiving is operable to receive the shutter control commands from a wireless data link, the wireless data link connected to a remote transmitter for transmitting to a plurality of 3-D glasses.

16. The method of claim 14, wherein the step of varying comprises controlling the fight and left lenses in an independent manner such that the operating parameters of the left lens can be varied independent of the operating parameters of the fight lens.

17. The method of claim 14, wherein the operating parameters comprise the duty cycle of the right and left lenses during a given frame.

18. The method of claim 17, wherein the shutter control command comprises a sync pulse for defining the frame timing, the sync pulse having the shutter control information imbedded therein and the step of receiving further comprising decoding from the sync pulse the imbedded shutter control information.

19. A method for controlling glasses having fight and left lenses that alternate between opaque and transmissive states during a given operating frame, the operating frames sequentially occurring in a periodic manner at a given synchronization rate, comprising the steps of:

receiving from an external source a shutter control command that comprises a sync pulse for defining the frame timing, the sync pulse having shutter control information imbedded therein and the step of receiving further comprising decoding from the sync pulse the imbedded shutter control information, the imbedded shutter control information comprising the length of the sync pulse, the length of the sync pulse defining the transmissive time of at least one of the fight and left lenses, and defining operating parameters of the right and left lenses, which shutter control information does not determine the periodic timing of the lenses, the operating parameters comprising the duty cycle of the right and left lenses during a given frame; and varying the operating parameters of the right and left lenses in accordance with the received shutter control information, such that the operating parameters of the right and left lens in one frame can be varied in the next and subsequent frame in response to the received shutter control information.

20. The method of claim 17, wherein the duty cycle of at least one of the fight and left lenses can be varied to be less than fifty percent.

21. The method of claim 20, wherein the duty cycle of both the right and left lenses is substantially equal.

22. The method of claim 17, wherein the duty cycle of at least one of the right and left lenses can be varied to be greater than fifty percent.

23. The method of claim 14, and further comprising allowing the user to input from an external input device shutter control command information to vary the operating parameters of the right and left lenses independent of the shutter control information received in the step of receiving.

24. A method for controlling glasses having right and left lenses that alternate between opaque and transmissive states during a given operating frame, the operating frames sequentially occurring in a periodic manner, comprising the steps of:

receiving from an external source frame synchronization information;

defining the duration of each frame that each of the right and left lenses are transmissive during a given frame; and varying the duration of time the right and left lenses are transmissive during a given frame in response to the receipt of an external shutter control command that defines the duty cycle of each of the right and left lenses, such that the operating parameters of the right and left lenses in one frame can be varied in the next and subsequent frame in response to the received external shutter control command.

25. The shutter control system of claim 24, wherein the right and left lenses are controlled by the step of varying in an independent manner such that the duty cycle of the left lens can be varied independent of the duty cycle of the right lens.

* * * * *

UNITED STATES PATENT AND TRADEMARK OFFICE
CERTIFICATE OF CORRECTION

PATENT NO. : 5,717,412
DATED : February 10, 1998
INVENTOR(S) : Edwards It is certified that error appears in the above-identified patent and that said Letters Patent is hereby corrected as shown below:

Column 1, line 39, delete "convened" and insert therefor --converted--;

Column 1, line 53, delete "mined" and insert therefor --turned--;

Column 2, line 6, delete "fight" and insert therefor --right--;

Column 3, line 45, delete "fight" and insert therefor --right--;

Column 3, line 47, delete "fight" and insert therefor --right--;

Column 3, line 50, delete "fight" and insert therefor --right--;

Column 3, line 55, delete "fight" and insert therefor --right--;

Column 3, line 59, delete "dam" and insert therefor --data--;

Column 4, line 36, delete "fight" and insert therefor --right--;

Column 6, line 1, delete "dam" and insert therefor --data--;

Column 6, line 5, delete "fight" and insert therefor --right--;

UNITED STATES PATENT AND TRADEMARK OFFICE
CERTIFICATE OF CORRECTION

PATENT NO. : 5,717,412
DATED : February 10, 1998
INVENTOR(S) : Edwards

It is certified that error appears in the above-indentified patent and that said Letters Patent is hereby corrected as shown below:

Column 6, line 7, delete "fight" and insert therefor --right--;

Column 6, line 12, delete "fight" and insert therefor --right--;

Column 6, line 17, delete "fight" and insert therefor --right--;

Column 6, line 28, delete "fight" and insert therefor --right--;

Column 6, line 33, delete "fight" and insert therefor --right--;

Column 6, line 53, delete "fight" and insert therefor --right--;

Column 9, line 36, delete "fight" and insert therefor --right--;

Column 9, line 44, delete "fight" and insert therefor --right--;

Column 9, line 50, delete "fight" and insert therefor --right--;

Column 10, line 2, delete "fight" and insert therefor --right--;

Column 10, line 9, delete "fight" and insert therefor --right--; and

Column 10, line 30, delete "fight" and insert therefor --right--.

Claim 5, column 11, line 23, delete "time" and insert therefor --frame--;

Claim 6, column 11, line 47, delete "fight" and insert therefor --right--;

UNITED STATES PATENT AND TRADEMARK OFFICE
CERTIFICATE OF CORRECTION

PATENT NO. : 5,717,412
DATED : February 10, 1998
INVENTOR(S) : Edwards

It is certified that error appears in the above-indentified patent and that said Letters Patent is hereby corrected as shown below:

Claim 6, column 11, line 49, delete "fight" and insert therefor –right–;

Claim 12, column 12, line 43, delete "flames" and insert therefor –frames–;

Claim 14, column 12, line 60, delete "fight" and insert therefor –right–;

Claim 14, column 12, line 67, delete "fight" and insert therefor –right–;

Claim 16, column 13, line 15, delete "fight" and insert therefor –right–;

Claim 16, column 13, line 18, delete "fight" and insert therefor –right–;

Claim 19, column 13, line 28, delete "fight" and insert therefor –right–; and

Claim 19, column 13, line 41, delete "fight" and insert therefor –right–.

Signed and Sealed this

Twenty-first Day of July, 1998

*Attest:*

BRUCE LEHMAN

*Attesting Officer*    *Commissioner of Patents and Trademarks*